(12) United States Patent
Kim et al.

(10) Patent No.: US 11,996,099 B2
(45) Date of Patent: May 28, 2024

(54) DIALOGUE SYSTEM, VEHICLE, AND METHOD OF CONTROLLING DIALOGUE SYSTEM

(71) Applicants: Hyundai Motor Company, Seoul (KR); Kia Corporation, Seoul (KR)

(72) Inventors: Sungwang Kim, Seoul (KR); Donghyeon Lee, Suwon-si (KR); Minjae Park, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 308 days.

(21) Appl. No.: 17/455,584

(22) Filed: Nov. 18, 2021

(65) Prior Publication Data

US 2022/0165264 A1 May 26, 2022

(30) Foreign Application Priority Data

Nov. 26, 2020 (KR) .................. 10-2020-0161645

(51) Int. Cl.
| | |
|---|---|
| *G10L 15/22* | (2006.01) |
| *B60W 40/08* | (2012.01) |
| *B60W 50/00* | (2006.01) |
| *G10L 15/08* | (2006.01) |
| *G10L 15/18* | (2013.01) |
| *G10L 15/26* | (2006.01) |

(52) U.S. Cl.
CPC .............. *G10L 15/22* (2013.01); *B60W 40/08* (2013.01); *B60W 50/0098* (2013.01); *G10L 15/1822* (2013.01); *G10L 15/26* (2013.01); *B60W 2540/21* (2020.02); *G10L 2015/088* (2013.01); *G10L 2015/223* (2013.01); *G10L 2015/225* (2013.01); *G10L 2015/227* (2013.01)

(58) Field of Classification Search
USPC ...................................... 704/1–504
See application file for complete search history.

(56) References Cited

U.S. PATENT DOCUMENTS

| | | | | |
|---|---|---|---|---|
| 9,805,020 | B2* | 10/2017 | Gorman ................. | G06F 40/30 |
| 10,685,358 | B2* | 6/2020 | Coman ................ | G06Q 10/063 |
| 10,818,297 | B2* | 10/2020 | Kim ........................ | G10L 17/22 |
| 10,937,424 | B2* | 3/2021 | Park .................... | G10L 15/1815 |
| 11,551,666 | B1* | 1/2023 | Bissell .................... | G10L 15/22 |
| 11,580,298 | B2* | 2/2023 | Galitsky ................ | G06F 16/322 |
| 11,631,400 | B2* | 4/2023 | Lee ........................ | G10L 15/063 |
| | | | | 704/232 |
| 11,749,265 | B2* | 9/2023 | Doggett .................. | G10L 15/22 |
| | | | | 704/235 |
| 11,763,663 | B2* | 9/2023 | Farrand ................ | G08B 25/008 |
| | | | | 340/517 |

(Continued)

*Primary Examiner* — Marcus T Riley
(74) *Attorney, Agent, or Firm* — Slater Matsil, LLP

(57) ABSTRACT

An embodiment dialogue system includes a speech recognizer configured to convert an utterance of a user into an utterance text, a natural language understanding module configured to identify an intention of the user based on the utterance text, and a controller configured to generate a first control signal for performing control corresponding to the intention of the user, identify whether an additional control item related to the control corresponding to the intention of the user exists, and in response to the additional control item existing, generate a second control signal for displaying information about the additional control item on a display.

18 Claims, 11 Drawing Sheets

(56) References Cited

U.S. PATENT DOCUMENTS

| | | | |
|---|---|---|---|
| 11,809,886 B2* | 11/2023 | Karashchuk | G06Q 10/107 |
| 2015/0186504 A1* | 7/2015 | Gorman | G06F 40/30 |
| | | | 707/752 |
| 2015/0199965 A1* | 7/2015 | Leak | G10L 15/22 |
| | | | 704/249 |
| 2018/0182382 A1* | 6/2018 | Lee | G10L 15/22 |
| 2018/0211663 A1* | 7/2018 | Shin | G10L 15/1815 |
| 2019/0272547 A1* | 9/2019 | Coman | G06N 5/046 |
| 2019/0378515 A1* | 12/2019 | Kim | G10L 17/22 |
| 2019/0392827 A1* | 12/2019 | Park | G10L 15/1815 |
| 2020/0074993 A1* | 3/2020 | Lee | G10L 15/22 |
| 2022/0165264 A1* | 5/2022 | Kim | B60W 50/0098 |
| 2022/0198151 A1* | 6/2022 | Park | G06F 40/44 |
| 2023/0315997 A9* | 10/2023 | Park | G06F 40/35 |
| | | | 704/9 |

* cited by examiner

FIG. 5

| Intent | Entity | ADDITIONAL CONTROL ITEM | | | |
|---|---|---|---|---|---|
| [Turn on, Air conditioner] | Temperature | 20°C | 21°C | 22°C | 23°C | 24°C |
| | Fan | Mild | Medium | Strong | Turbo | |
| [Turn on, Seat warmer] | Position | Left rear seat | Right rear seat | Driver seat | Front seat | |
| | Level | Level 1 | Level 2 | Level 3 | | |
| [Ask, Weather] | Location | UIJEONGBU | GANGNAM STATION | AEJEON | | |
| | Date | Today | Tomorrow | This weekend | Next week | |

FIG. 6
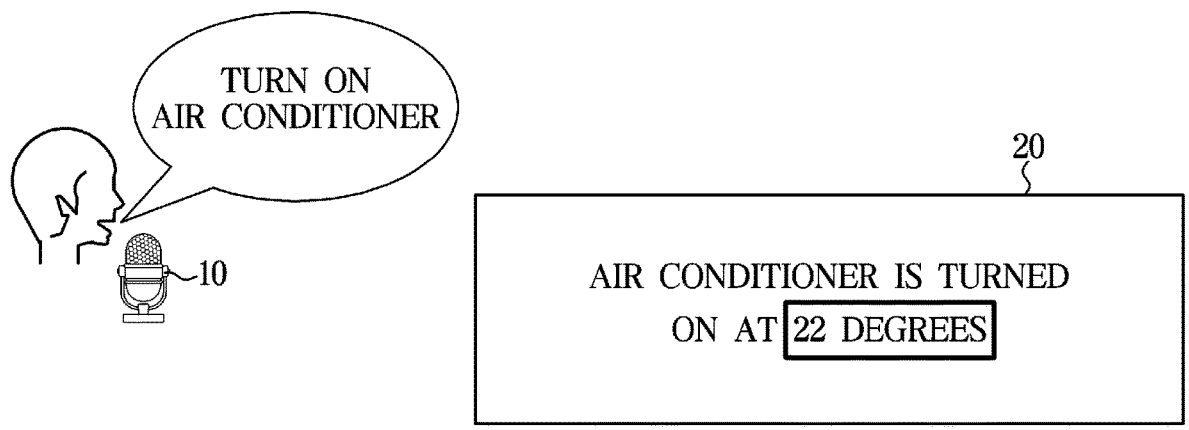
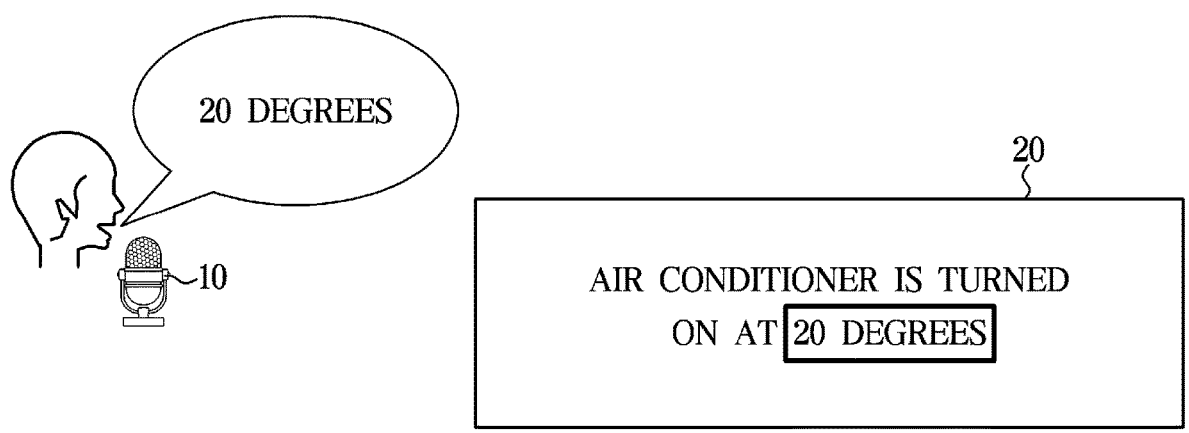

FIG. 7
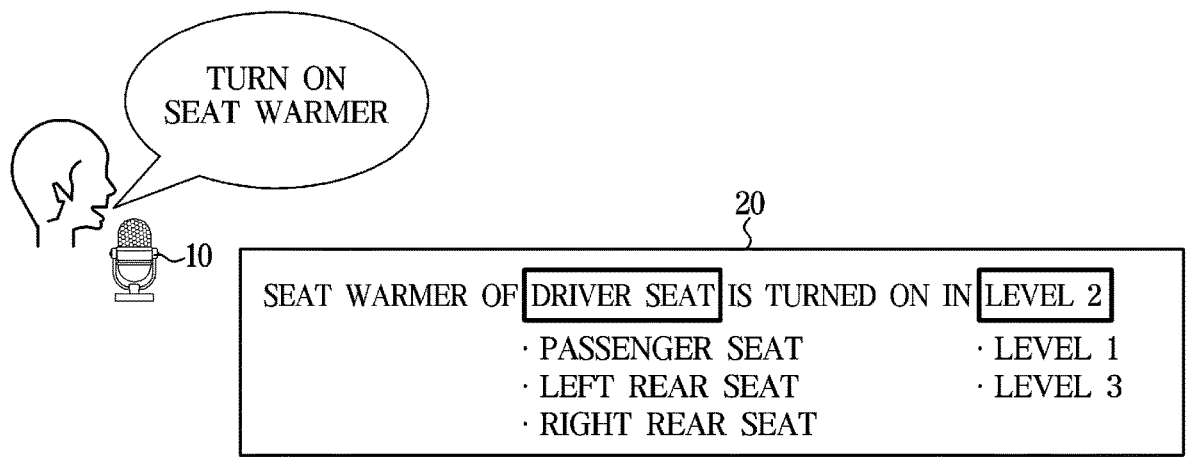
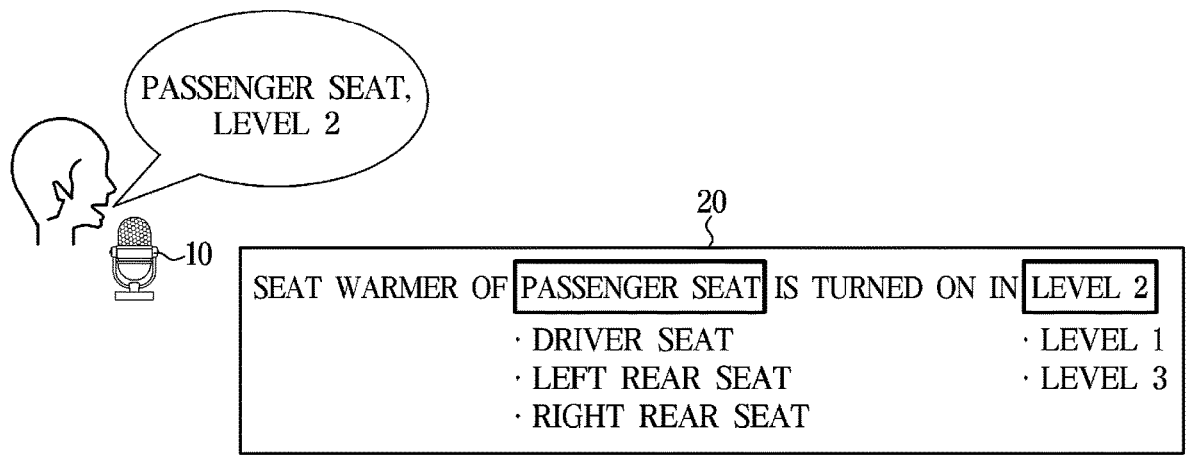

FIG. 8
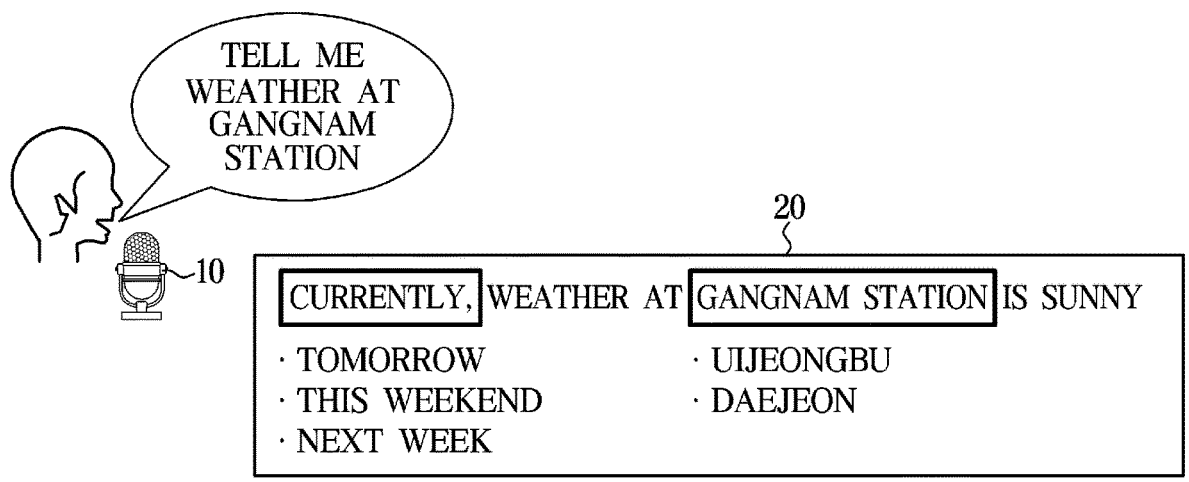
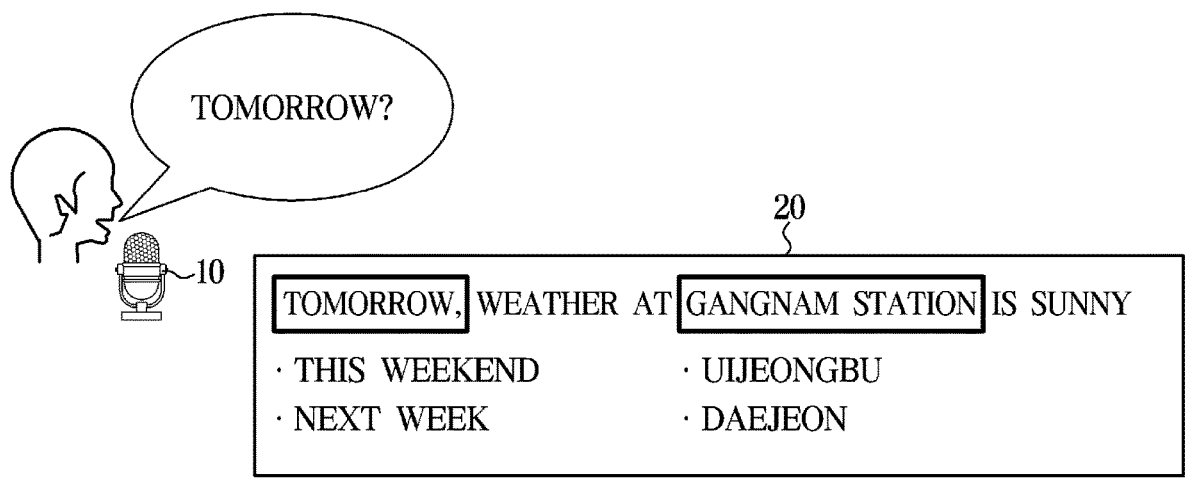

FIG. 9
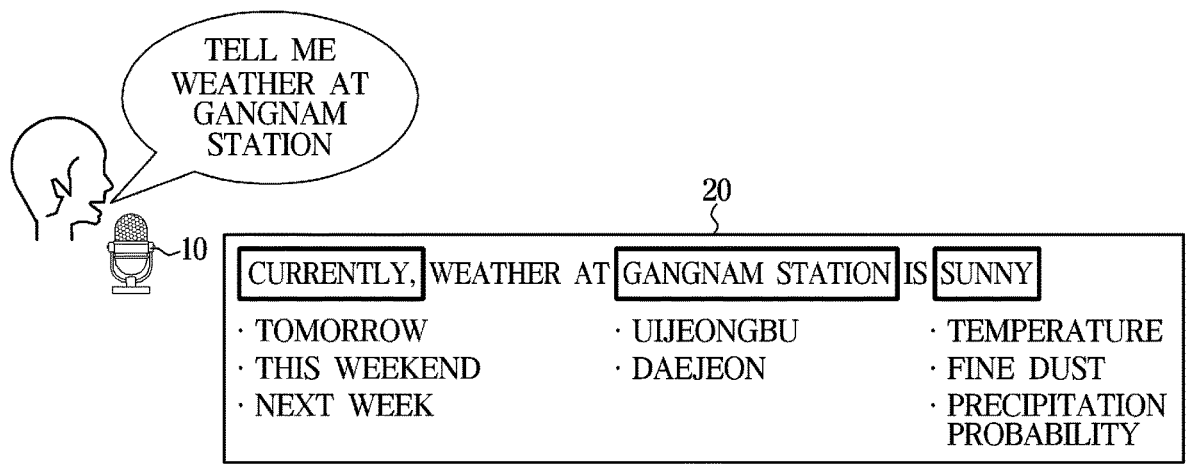
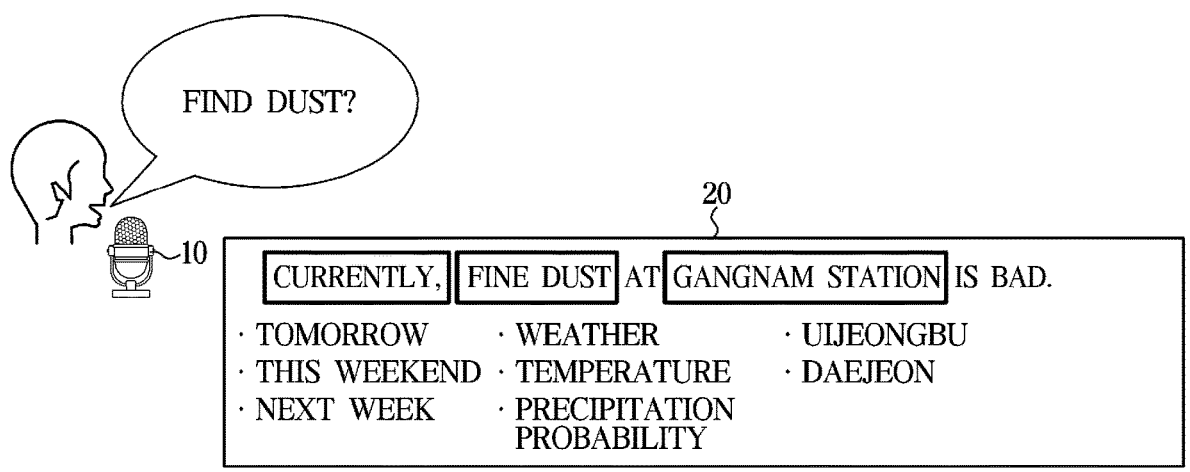

DIALOGUE SYSTEM, VEHICLE, AND METHOD OF CONTROLLING DIALOGUE SYSTEM

CROSS-REFERENCE TO RELATED APPLICATIONS

This application claims the benefit of Korean Patent Application No. 10-2020-0161645, filed on Nov. 26, 2020, which application is hereby incorporated herein by reference.

TECHNICAL FIELD

The present disclosure relates to a dialogue system, a vehicle, and a method of controlling a dialogue system.

BACKGROUND

A dialogue system is a system capable of identifying an intention of a user through a dialogue with the user and providing a service corresponding to the identified intention of the user.

The dialogue system may be linked to a specific device and perform control on the device according to the intention of a user, or may provide specific information according to the intention of a user. In performing control or providing information as such, a single utterance of a user may not include all pieces of information required for identifying the intention of the user.

In this case, the dialogue system may acquire the required information through an additional utterance of the user, but as an additional utterance of the user is induced and the required information is acquired therefrom, the workflow may be lengthened and the provision of the service desired by the user may be delayed.

SUMMARY

The present disclosure relates to a dialogue system, a vehicle, and a method of controlling a dialogue system. Particular embodiments relate to a dialogue system, a vehicle, and a method of controlling a dialogue system that are capable of providing a service corresponding to a user's utterance.

Embodiments of the present disclosure provide a dialogue system, a vehicle, and a method of controlling a dialogue system that are capable of identifying control corresponding to an intention of a user and an additional control item related to the control on the basis of a user's utterance, and visually outputting information about the additional control item, thereby easily and rapidly inducing a user's additional utterance, and enabling a natural dialogue and continuous control.

Additional embodiments of the disclosure will be set forth in part in the description which follows and, in part, will be obvious from the description, or may be learned by practice of the disclosure.

According to an embodiment of the disclosure, there is provided a dialogue system including a speech recognizer configured to convert an utterance of a user into an utterance text, a natural language understanding module configured to identify an intention of the user which the utterance text indicates, and a controller configured to generate a first control signal for performing control corresponding to the intention of the user, wherein the controller may be configured to identify whether an additional control item related to the control corresponding to the intention of the user exists, and in response to the additional control item existing, generate a second control signal for displaying information about the additional control item on a display.

The controller may be configured to transmit the second signal to the display while the control corresponding to the intention of the user is being performed.

The controller may be configured to, in response to an additional utterance of the user being input corresponding to the additional control item, generate a third control signal for performing control on the additional control item based on the input additional utterance of the user.

The natural language understanding module may be configured to determine a domain, an intent, and a value of an entity corresponding to the utterance text to identify the intention of the user corresponding to the utterance text.

The controller may be configured to, in response to the value of the entity being changeable, generate the second control signal for displaying information about the changeable value of the entity.

The controller may be configured to, in response to a target of the entity being changeable, generate the second control signal for displaying information about the changeable target of the entity.

The controller may be configured to, in response to the additional utterance of the user including the changed value of the entity, generate the third control signal for performing control according to the changed value of the entity included in the additional utterance of the user.

The controller may be configured to, in response to the additional utterance of the user including the changed target, generate the third control signal for performing control according to the changed target included in the additional utterance of the user.

According to another embodiment of the disclosure, there is provided a vehicle including a microphone configured to receive an utterance of a user, a communicator configured to transmit the received utterance of the user to a dialogue system that identifies an intention of the user corresponding to the utterance of the user, and receive a first control signal for performing control corresponding to the intention of the user from the dialogue system, a controller configured to perform control according to the received first control signal, and a display configured to display information about an additional control item related to the control corresponding to the intention of the user while the control according to the first control signal is being performed.

The communicator may be configured to, in response to an additional utterance of the user being input to the microphone corresponding to the additional control item, transmit the input additional utterance of the user to the dialogue system and receive a third control signal for performing control on the additional control item from the dialogue system.

The display may be configured to, in response to a value of an entity extracted from the utterance of the user being changeable, display information about the changeable value of the entity.

The display may display a list indicating the changeable values of the entity.

The display may be configured to, in response to a target extracted from the utterance of the user being changeable, display information about the changeable target.

The display may display a list indicating changeable types of the target.

According to another embodiment of the disclosure, there is provided a method of controlling a dialogue system, the method including converting an utterance of a user into an utterance text, identifying an intention of the user which the utterance text indicates, generating a first control signal for performing control corresponding to the intention of the user, and in response to an additional control item related to the control corresponding to the intention of the user being in existence, generating a second control signal for displaying information about the additional control item on a display.

The method may further include transmitting the second signal to the display while the control corresponding to the intention of the user is being performed.

The method may further include, in response to an additional utterance of the user being input corresponding to the additional control item, generating a third control signal for performing control on the additional control item based on the input additional utterance of the user.

The identifying of the intention of the user may include determining a domain, an intent, and a value of an entity corresponding to the utterance text.

The generating of the second signal may include, in response to the value of the entity extracted from the utterance text being changeable, generating the second control signal for displaying information about the changeable value of the entity on the display.

The generating of the second signal may include, in response to the target extracted from the utterance text being changeable, generating the second control signal for displaying information about the changeable target on the display.

The generating of the third signal may include, in response to the additional utterance of the user including the changed value of the entity, generating the third control signal for performing control according to the changed value of the entity.

The generating of the third signal may include, in response to the additional utterance of the user including the changed target, generating the third control signal for performing control according to the changed target.

BRIEF DESCRIPTION OF THE DRAWINGS

These and/or other embodiments of the disclosure will become apparent and more readily appreciated from the following description of the embodiments, taken in conjunction with the accompanying drawings, in which:

FIG. 5 is a table showing an example of an additional control item for each intent corresponding to an utterance of a user;

FIGS. 6 to 9 are diagrams illustrating an operation performed by a dialogue system and a vehicle to receive an additional utterance of a user according to an embodiment;

DETAILED DESCRIPTION OF ILLUSTRATIVE EMBODIMENTS

Figure 1:
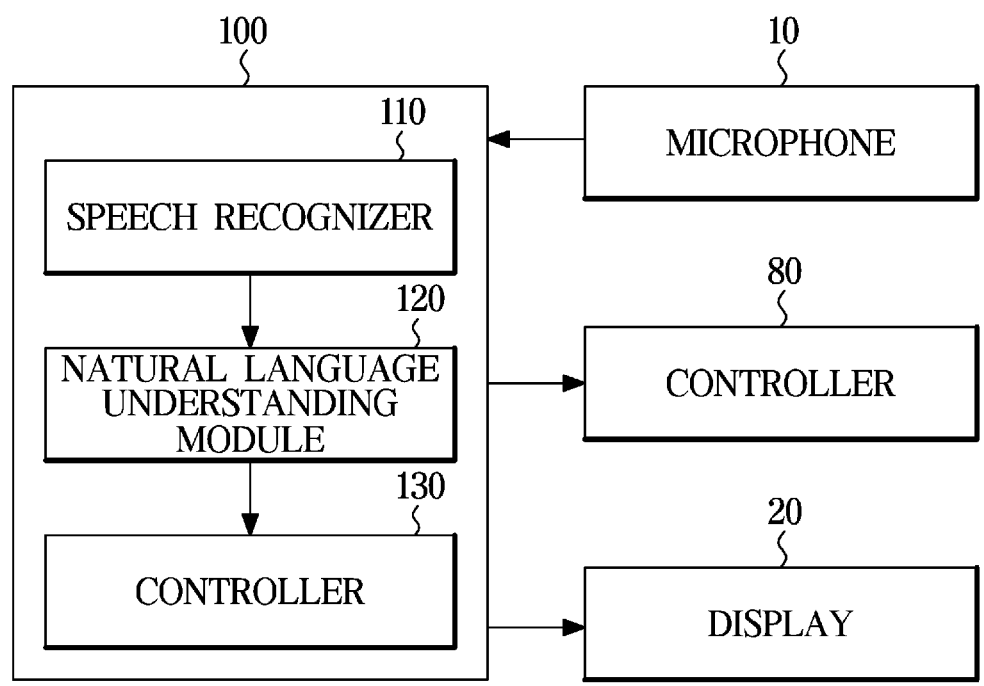
FIG. 1 is a control block diagram illustrating a dialogue system according to an embodiment.

The embodiments set forth herein and illustrated in the configuration of the present disclosure are only preferred embodiments, so it should be understood that they may be replaced with various equivalents and modifications at the time of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The terms, such as "~part", "~device", "~block", "~member", "~module", and the like may refer to a unit for processing at least one function or act. For example, the terms may refer to at least process processed by at least one hardware, such as a field-programmable gate array (FPGA)/application specific integrated circuit (ASIC), software stored in memories, or processors.

Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Hereinafter, embodiments of a dialogue system, a vehicle, and a control method thereof will be described in detail with reference to the accompanying drawings.

FIG. 1 is a control block diagram illustrating a dialogue system according to an embodiment.

Referring to FIG. 1, a dialogue system 100 according to an embodiment includes a speech recognizer 110 configured to convert a user's utterance into an utterance text, a natural language understanding module 120 configured to identify an intention of a user corresponding to the utterance text, and a controller 130 configured to generate a control signal for performing control corresponding to the intention of the user.

The speech recognizer 110 may be implemented as a Speech to Text (STT) engine, and may apply a speech recognition algorithm to the user's utterance to convert the user's utterance into a text.

For example, the speech recognizer 110 may use feature vector extraction technique, such as Cepstrum, Linear Predictive Coefficient (LPC), Mel Frequency Cepstral Coefficient (MFCC) or Filter Bank Energy, to extract a feature vector from a user's utterance.

Then, the speech recognizer 110 may compare the extracted feature vector with a trained reference pattern to obtain a recognition result. To this end, an acoustic model that models and compares signal characteristics of a speech or a language model that models a linguistic order relationship of words or syllables corresponding to a recognized vocabulary may be used.

In addition, the speech recognizer 110 may convert a user's utterance into an utterance text based on learning that employs machine learning or deep learning. In the present embodiment, there is no limitation on the method of converting a user's utterance into an utterance text by the speech recognizer 110. Accordingly, the speech recognizer 110 may employ various speech recognition technologies in addition to the above-described method to convert a user's utterance into an utterance text.

The natural language understanding module 120 may employ a natural language understanding (NLU) technology to identify an intention of a user which the utterance text indicates. Accordingly, the natural language understanding module 120 may include an NLU engine that identifies an intention of a user by applying an NLU technique to an input sentence.

For example, the natural language understanding module 120 may recognize an entity name from an utterance text. The entity name is a proper noun, such as a person's name, place name, organization name, time, date, currency, etc., and the recognition of the entity name is a task of identifying an entity name in a sentence and determining the type of the identified entity name. The recognition of the entity name allows important keywords to be extracted from a sentence and the meaning of the sentence to be grasped.

In addition, the natural language understanding module 120 may determine a domain from the utterance text. The domain allows the subject of the user's utterance to be identified. For example, domains representing various subjects, such as home appliance control, information about schedules, weather or traffic conditions, text transmission, navigation, vehicle control, etc., may be determined based on the utterance text.

In addition, the natural language understanding module 120 may analyze a speech act of the utterance text. Analysis of a speech act is a task of analyzing the intention of an utterance, and identifies the intention of the utterance, for example, whether the user asks a question, makes a request, makes a response, or expresses a simple emotion.

The natural language understanding module 120 may identify an intent and an entity required to perform the intent based on information, such as a domain, an entity name, and a speech act extracted from the utterance text. For example, if the utterance text is "Turn on the air conditioner", the domain may be [vehicle control], the intent may be [turn on, air conditioner], and the entity required to perform control corresponding to the intent may be [temperature, air volume].

The intent may be determined by an action and a target. In the above example, the action is "turn on", and the target is "the air conditioner". However, since the terms may be different between dialogue systems, a term "operator" may be used instead of "action" and a term "object" may be used instead of "target". Regardless of the terms used herein, various terms may be included in the scope of the action and target in the present embodiment as long as they can determine or define the intent corresponding to the user's utterance.

Distinction between an intent and an entity according to a user's utterance will be described in more detail below.

The intention of a user may be defined by a domain, an intent, and a value of an entity extracted from an utterance text. Accordingly, in order for the dialogue system 100 to accurately identify the intention of a user included in a user's utterance, information about the domain, the intent, and the value of the entity is required.

The controller 130 may generate a control signal for performing control corresponding to an intention of a user, and transmit the generated control signal to an object that performs the corresponding control. Depending on the implementation of the dialogue system 100, the controller 130 may directly transmit the control signal to the object performing the corresponding control, or may transmit the control signal to the object through other components. When the object performing the corresponding control is located at a remote site, the control signal may be transmitted through a communicator.

Meanwhile, the controller 130 may identify whether an additional control item related to control corresponding to the intention of a user exists, and in response to the additional control item being in existence, generate a control signal for displaying information about the additional control item on a display 20.

In an embodiment to be described below, in order to distinguish various control signals from each other, a control signal for performing primary control corresponding to the intention of a user is referred to as a first control signal, and a control signal for displaying information about an additional control item on a display is referred to as a second control signal.

A user's utterance converted into an utterance text in the dialogue system 100 may be input through a microphone 10, and information regarding an additional control item may be displayed on the display 20. Control corresponding to the intention of a user may be performed by a controller 80.

The microphone 10 and the display 20 may be provided in an object performing control according to the control signal generated by the dialogue system 100. For example, the object performing the control may be a vehicle or a home appliance, such as a refrigerator or a television (TV).

Alternatively, the microphone 10 and the display 20 may be provided in a gateway that relays the dialogue system 100 and an object performing control. For example, the gateway may be a mobile device, such as a mobile phone, a tablet personal computer (PC), or the like, an artificial intelligence (AI) speaker, or a user terminal, such as a laptop PC.

Hereinafter, for a detailed description, a case in which an object performing control is a vehicle will be described as an example.

Figure 2:
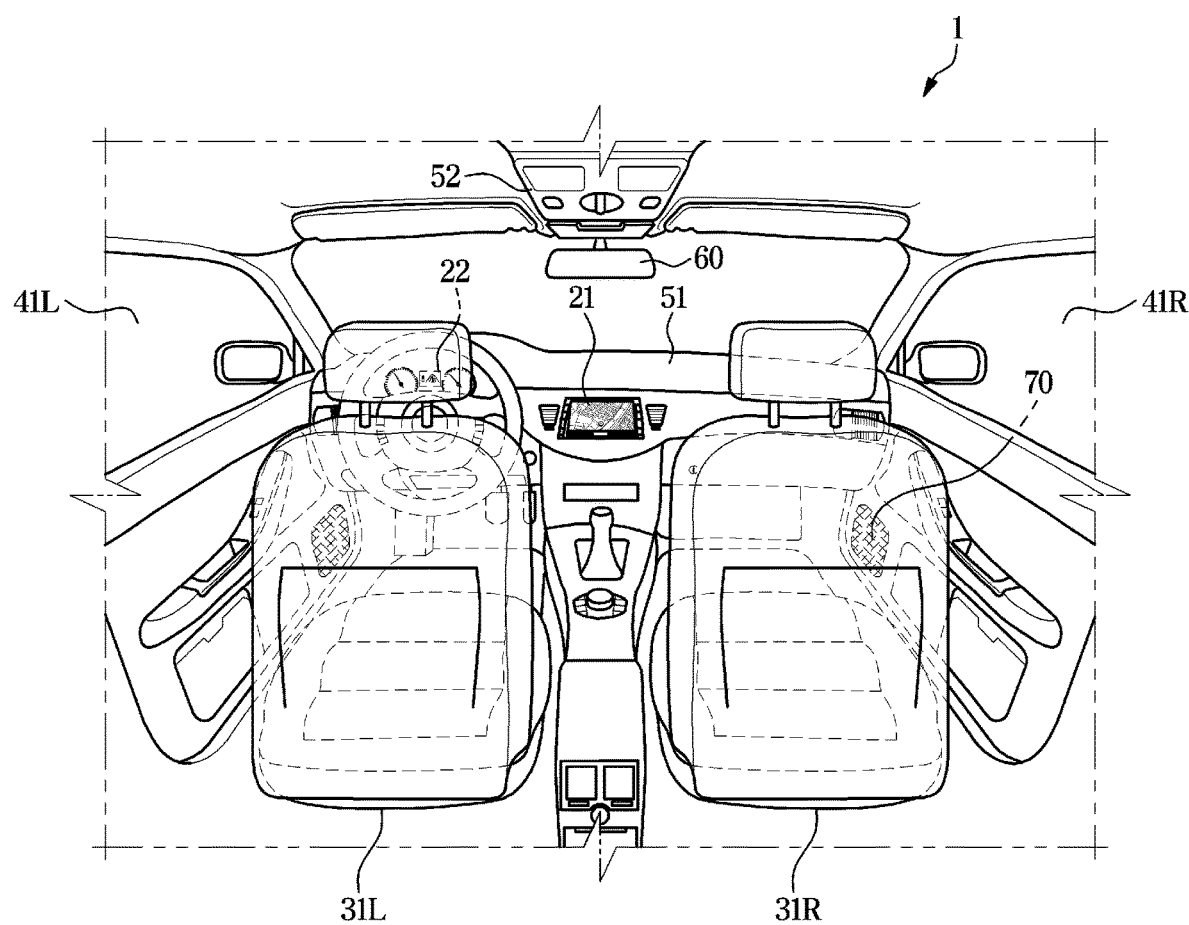
FIG. 2 is a diagram illustrating an example of an internal configuration of a vehicle according to an embodiment.

FIG. 2 is a diagram illustrating an example of an internal configuration of a vehicle according to an embodiment.

Referring to FIG. 2, an audio video navigation (AVN) device may be provided in one area of a dashboard 51 of a vehicle 1, and the AVN device may include an AVN display 21 displaying information required to perform an audio, video, or navigation function. In an area corresponding to a driver's seat 31L in the dashboard 51, a cluster display 22 displaying the state of the vehicle 1 or driving related information may be provided.

The display 20 for displaying information about an additional control item described above may include the AVN display 21 and the cluster display 22. Accordingly, the second control signal generated by the controller 130 of the dialogue system 100 may be transmitted to the AVN display 21 or the cluster display 22, and the AVN display 21 or the cluster display 22 may display information about the additional control item according to the transmitted second signal.

Alternatively, the second control signal may be transmitted to the controller 80, and the controller 80 may control the AVN display 21 or the cluster display 22 based on the second control signal to display information about the additional control item.

However, the AVN display 21 or the cluster display 22 are only examples applicable to the vehicle 1, and the display 20 is not limited in the position thereof, as long as it can provide information to a user including a driver or a passenger.

The microphone 10 may be provided inside the vehicle 1 to receive a user's utterance. The microphone 10 may be provided on a headlining 52 on the front of the vehicle 1, on a steering wheel, on a rearview mirror 60, or on the dashboard 51. The microphone 10 is not limited in the position thereof as long as it can receive a user's utterance.

The dialogue system 100 according to an embodiment may be implemented as a server. In this case, the speech recognizer 110, the natural language understanding module 120, and the controller 130 may be implemented by a memory and a processor provided in the server, and the speech recognizer 110, the natural language understanding module 120, and the controller 130 may share the memory or the processor, or may use a separate memory or processor.

Alternatively, some operations of the dialogue system 100 may be performed in the vehicle 1. For example, the speech recognizer 110 may be provided in the vehicle 1 to convert a user's utterance into an utterance text in the vehicle 1 and transmit the converted utterance text to the server.

Alternatively, the dialogue system 100 may be included in the vehicle 1. In this case, the memory and the processor provided in the vehicle 1 may perform the operations of the speech recognizer 110, the natural language understanding module 120, and the controller 130.

In the embodiment to be described below, for a detailed description, a case in which the dialogue system 100 is implemented as a separate server will be described as an example.

Figure 3:
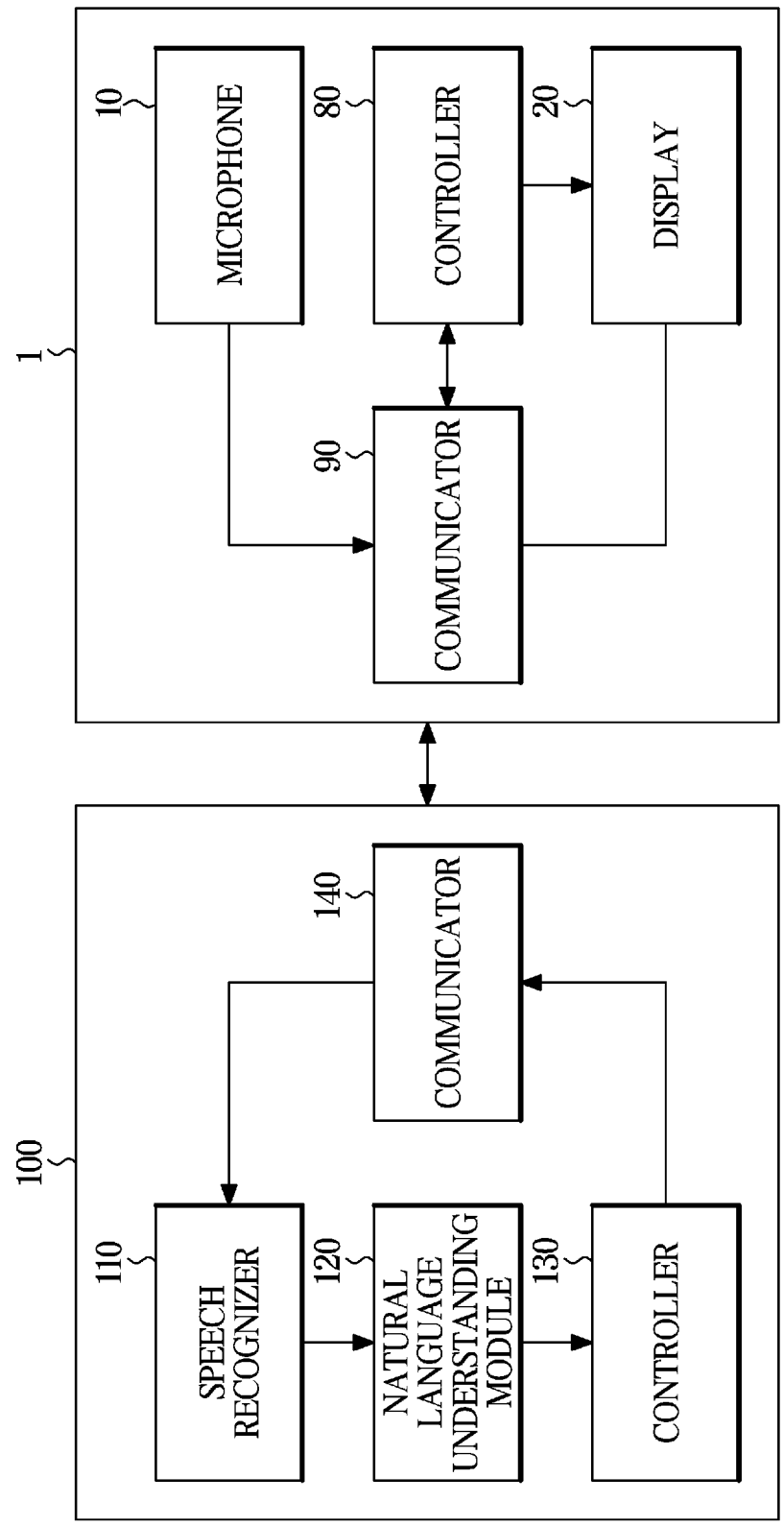
FIG. 3 is a control block diagram illustrating a dialogue system, which is implemented as a remote server, and a vehicle according to an embodiment.
Figure 4:
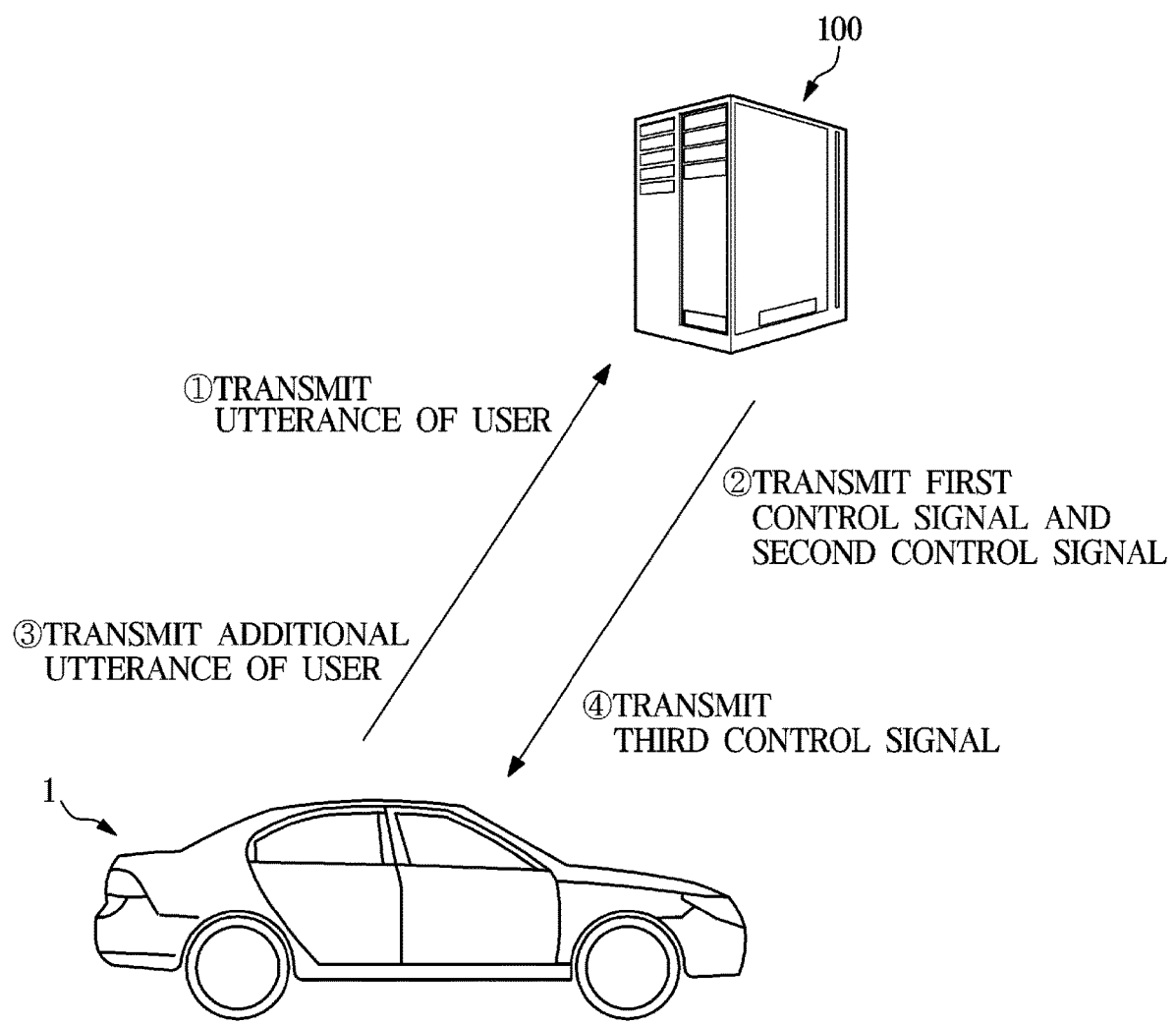
FIG. 4 is a diagram illustrating an example of signals exchanged between a dialogue system and a vehicle according to an embodiment.

FIG. 3 is a control block diagram illustrating a dialogue system, which is implemented as a remote server, and a vehicle according to an embodiment, and FIG. 4 is a diagram illustrating an example of signals exchanged between a dialogue system and a vehicle according to an embodiment.

Referring to FIG. 3, the dialogue system 100 according to the embodiment may further include a communicator 140 for transmitting and receiving signals to and from the vehicle 1, and the vehicle 1 according to the embodiment may further include a communicator 90 for transmitting and receiving signals to and from the dialogue system 100.

The controller 80 of the vehicle 1 may perform control on an air conditioner, a seat warmer, positions of seats 31L and 31R, windows 41L and 41R, and the like of the vehicle 1, and may perform control on an input/output device, such as the microphone 10, the display 20, and the speaker 70.

The communication method between the communicator 90 of the vehicle 1 and the communicator 140 of the dialogue system 100 may employ at least one of various wireless communication methods, such as 4G, 5G, and WiFi.

Referring to FIG. 4, when a user inputs a user's utterance through the microphone 10 provided in the vehicle 1, ① the communicator 90 provided in the vehicle 1 transmits the input user's utterance to the dialogue system 100. Here, the user's utterance may be converted into a form of a speech signal by the microphone 10 and then transmitted to the dialogue system 100.

The speech recognizer 110 of the dialogue system 100 may convert the user's utterance into an utterance text, and the natural language understanding module 120 may recognize the intention of a user which the utterance text indicates. As described above, the intention of a user may be defined by a domain, an intent, and a value of an entity.

The controller 130 of the dialogue system 100 may generate a first control signal for performing control corresponding to the intention of a user and a second control signal for displaying information about an additional control item related to the control corresponding to the intention of the user.

② The communicator 140 of the dialogue system 100 may transmit the generated first and second control signals to the vehicle 1.

The communicator 90 of the vehicle 1 may receive the first control signal and the second control signal, and at the same time as the controller 80 performs control according to the first control signal, the display 20 may display information about an additional control item according to the second control signal on the display 20.

When the user inputs an additional utterance of a user into the microphone 10 to perform additional control, ③ the communicator 90 of the vehicle 1 may transmit the additional utterance of the user to the dialogue system 100.

When the communicator 140 of the dialogue system 100 receives the additional utterance of the user, and the speech recognizer 110 converts the additional utterance of the user into an additional utterance text, the natural language understanding module 120 identifies the intention of the user corresponding to the additional utterance text.

The controller 130 of the dialogue system 100 may generate a third control signal for performing additional control, and ④ the communicator 140 of the dialogue system 100 may transmit the third control signal to the vehicle 1.

The communicator 90 of the vehicle 1 may receive the third control signal, and the controller 80 of the vehicle 1 may perform additional control according to the third control signal.

Although not shown in the drawings, reception of the additional utterance of the user and additional control corresponding thereto may be performed without limitation in the number of times. Specifically, the dialogue system 100 may identify whether an additional control item related to the control corresponding to the intention of the user exists even after receiving the additional utterance of the user. In response to an additional control item existing, the dialogue system 100 may generate a fourth control signal for displaying information about the additional control item and transmit the generated fourth control signal to the vehicle 1 together with the third control signal. When the vehicle 1 displays the information about the additional control item according to the fourth control signal, the user may input an additional utterance to perform additional control, and the input additional utterance may be transmitted to the dialogue system 100. Such a series of operations may be repeated until there is no additional control item.

FIG. 5 is a table showing an example of an additional control item for each intent corresponding to an utterance of a user.

As described above, the intention of a user included in a user utterance may be defined by a domain, an intent, and a value of an entity, and the value of the entity may have a plurality of values that are changeable. However, the value of the entity may not be included in the utterance of the user. In this case, the intention of the user may be defined by the domain and the intent.

Referring to FIG. 5, as in the example described above, when the utterance text is "turn on the air conditioner", the domain may be [vehicle control], the intent may be [turn on, air conditioner], and the entity may be [temperature, air volume or fan]. The value of the entity may include a temperature value, such as 20 degrees, 21 degrees, 22 degrees, 23 degrees, and 24 degrees, and an air volume value, such as mild, medium, strong, and turbo.

When the utterance text is "Turn on the seat warmer", the domain may be [vehicle control], the intent may be [turn on, seat warmer], and the entity may be [position, level]. The value of the entity may include a position value, such as left rear seat, right rear seat, driver's seat, and passenger seat, and a level value, such as level 1, level 2, and level 3.

When the utterance text is "Tell me the weather", the domain may be [provision of information], the intent may be [ask, weather], and the entity may be [region or location, date]. The value of the entity may include region values, such as Uijeongbu, Gangnam Station, and Daejeon, and date values, such as today, tomorrow, this weekend, and next week. Here, the region value may be determined by reflecting a point of interest (POI) of the user. For example, the user's home, workplace, frequently visited area, recently visited area, and saved area may be set as the changeable region values. A region related or adjacent to a region that has been previously uttered by a user may be set as the changeable region value.

The example of the utterance text described above does not include the value of the entity for each intent. When the user utterance does not include the value of the entity, the controller 130 may generate the third control signal based on a value of the entity that is set as a default. Alternatively, the natural language understanding module 120 may output the value of the entity set as a default together with the domain and the intent. The highlighted values among the values of the entities shown in the table of FIG. 5 are the values of the entities set as a default for respective intents.

Here, a change in the value of an entity may provide an additional control item. For example, when a user utterance does not include the value of an entity, an additional utterance of the user including the value of the entity may be input from the user, and additional control may be performed according to the value of the entity included in the additional utterance of the user. Even when an utterance of a user includes the value of an entity, additional control for changing to another value of the entity may be performed.

In this case, even when the user inputs an utterance corresponding to only an additional control item without uttering the entire sentence, the dialogue system 100 may recognize the intention of the user. Specifically, even when the user does not input the entire utterance for determining all of the domain, the intent, and the value of the entity, the dialogue system 100 may identify the intention of the user only when the value of the entity is included in the additional utterance of the user.

For example, the natural language understanding module 120 may identify the value of an entity based on an additional utterance text output from the speech recognizer 110. In this case, the natural language understanding module 120 or the controller 130 may determine the value of the entity based on the current context even without information about the domain or intent, and generate a control signal (a third control signal) for performing additional control (additional control related to the control that is already being performed) that matches the intention of the user.

FIGS. 6 to 9 are diagrams illustrating an operation performed by a dialogue system and a vehicle to receive an additional utterance of a user according to an embodiment.

FIG. 6 is an example of a case in which a user inputs an utterance "turn on air conditioner" into the microphone 10. The natural language understanding module 120 of the dialogue system 100 may determine the intent [turn on, air conditioner] from the input user utterance, but may not determine the value of the entity (a temperature value). In this case, the controller 130 may generate a first control signal for performing control according to a value of the entity set as a default (22 degrees in the present example).

Referring to FIG. 5 described above, the temperature value of the air conditioner is changeable. That is, since the temperature of the air conditioner corresponds to an additional control item, the controller 130 may generate a second control signal for displaying information about the additional control item on the display 20. Here, the second control signal may include a command for displaying the information about the additional control item on the display 20, or may include only the information about the additional control item. In the latter case, the controller 80 of the vehicle 1 may generate a command for displaying the information about the additional control item and transmit the command to the display 20.

The generated first and second control signals may be transmitted to the vehicle 1, and the controller 80 of the vehicle 1 may perform control according to the first control signal, that is, control to turn on the air conditioner at 22 degrees, and the display 20 may display a text "air conditioner is turned on at 22 degrees", which is information indicating a current control situation, as shown in FIG. 6.

In this case, the information about the additional control item may be displayed in various ways. For example, as shown in FIG. 6, the text indicating the temperature may be emphasized such that the user may recognize that the temperature is changeable.

The user may see the display 20 to check the current set temperature at the same time as identifying that the temperature is changeable. The user who desires to change the temperature may input an additional utterance of the user through the microphone 10.

The user may not utter the entire sentence for changing the temperature of the air conditioner, such as "Turn on the air conditioner at 20 degrees", but only input an utterance related to the additional control item. In the present example, even with an utterance of only the temperature value "20 degrees", which is the value of the entity to be changed, the dialogue system 100 may identify the intention of the user and generate a third control signal for performing additional control corresponding to the intention of the user, and transmit the generated third signal to the vehicle 1.

The vehicle 1 may perform additional control according to the third control signal. That is, the vehicle 1 may change the temperature of the air conditioner to 20 degrees, and display information about the changed temperature on the display 20.

FIG. 7 is an example of a case in which a user inputs a user's utterance "Turn on seat warmer" into the microphone 10. Referring to FIG. 7, the natural language understanding module 120 of the dialogue system 100 may determine the intent [turn on, seat warmer] from the input utterance of the user, but may not determine the value of the entity (position, level). In this case, the controller 130 may generate a first control signal for performing control according to a value of the entity set as a default (the driver's seat, level 2 in the present example).

Referring to FIG. 5 described above, the position and the level of the seat warmer are changeable. That is, since the position and the level of the seat warmer correspond to additional control items, the controller 130 may generate a second control signal for displaying information about the additional control items on the display 20.

The generated first and second control signals may be transmitted to the vehicle 1, and the controller 80 of the vehicle 1 may perform control according to the first control signal, that is, control for turning on the seat warmer of the driver's seat in level 2, and the display 20 may display a text "seat warmer of driver seat is turned on in level 2", which is information indicating the current control situation, as shown in FIG. 7.

In this case, the information about the additional control items may be displayed in various ways. For example, as shown in FIG. 7, a text indicating the position and level of the seat warmer may be emphasized such that the user may recognize that the position and level are changeable.

In addition, a list indicating the changeable values of the entities may be further displayed on the display 20. For example, as shown in FIG. 7, a list including the passenger seat, the left rear seat, and the right rear seat, which are changeable position values, may be displayed, and a list including levels 1 and 3, which are changeable level values, may be displayed.

The user may see the display 20 to check the current setting position and level at the same time as identifying that the position and level are changeable. The user who desires to change the position and level may input an additional utterance of the user through the microphone 10.

The user may not utter the entire sentence, such as "Turn on the seat warmer of the passenger seat in level 2", but may only input an utterance related to the additional control item. In the present example, even only with an utterance of the position value and the level value "passenger seat, level 2", which are the values of the entities to be changed, the dialogue system 100 may identify the intention of the user, and generate a third control signal for performing additional control corresponding to the intention of the user and transmit the generated third control signal to the vehicle 1.

The vehicle 1 may perform additional control according to the third control signal. That is, the vehicle 1 may turn on the seat warmer of the passenger seat in level 2, and display information about the control on the display 20.

Meanwhile, unlike the example of FIG. 6 described above, in the present example, control according to the first control signal and additional control according to the third control signal are compatible. That is, both controls may be performed simultaneously. In this case, the vehicle 1 may simultaneously perform the additional control according to the third control signal without cancelling the control according to the first control signal.

In addition, according to an additional utterance of a user, it may be determined whether to cancel control according to the first control signal. For example, when a negative word, such as "no" is included in the additional utterance of the user, the controller 80 of the dialogue system 100 may include a command for canceling the control according to the first control signal in the third control signal. Conversely, when a negative word is not included in the additional utterance of the user, the controller 80 may not include a cancellation command in the third control signal.

As another example, when an additional utterance of the user includes a word having a meaning of addition, such as "and", the controller 80 of the dialogue system 100 may not include a command for cancelling control according to the first control signal in the third control signal. Conversely, when an additional utterance of the user does not include a word having a meaning of addition, the controller 80 may include a cancellation command in the third control signal.

FIG. 8 is an example of a case in which a user inputs a user's utterance "Tell me weather at Gangnam Station" into the microphone 10. The natural language understanding module 120 of the dialogue system 100 may determine an intent [ask, weather] and a region value, which is one of entity values, from the input utterance of the user, but may not determine a date value of the entity values. In this case, the controller 130 may generate a first control signal for performing control according to an entity value set as a default ("currently" in the present example).

Referring to FIG. 5 described above, when requesting weather information, a region and a date are changeable. Meanwhile, even when the utterance of the user includes an entity value, the corresponding entity value may be changeable and information about the changeable entity value may be provided to the user. That is, since changes of the region value and the date value correspond to additional control items, the controller 130 may generate a second control signal for displaying information about the additional control items on the display 20. In this case, when the server of the dialogue system 100 does not have the weather information, the weather information may be obtained from a server that provides the weather information.

The generated first and second control signals may be transmitted to the vehicle 1, and the controller 80 of the vehicle 1 may perform control according to the first control signal, that is, may display information about the current weather at Gangnam Station on the display 20.

In this case, information about the additional control items may also be displayed. For example, as shown in FIG. 8, a text indicating a date and a region may be emphasized to notify the user that the user may request weather information of a different date and a different region.

In addition, a list indicating the changeable values of the entities may be displayed on the display 20. For example, as shown in FIG. 8, a list including changeable date values, such as tomorrow, this weekend, and next week, may be displayed, and a list including changeable region values, Uijeongbu and Daejeon, may be displayed.

The user may see the display 20 to check the current weather of Gangnam Station at the same time as identifying that the user may request weather information of a different region and a different date. The user who desires to change a region or a date may input an additional utterance of the user through the microphone 10.

The user may not utter the entire sentence, such as "Tell me the weather at Gangnam Station tomorrow" but may input only an utterance related to an additional control item. In the present example, even only with an utterance of the date value "tomorrow?", which is the value of the entity to be changed, the dialogue system 100 may identify the intention of the user and generate a third control signal for performing additional control corresponding to the intention of the user and transmit the generated third control signal to the vehicle 1.

The vehicle 1 may perform additional control according to the third control signal. That is, the vehicle 1 may display information about tomorrow's weather at Gangnam Station on the display 20.

FIG. 9 also illustrates a case in which a user inputs a user's utterance "Tell me weather at Gangnam Station" into the microphone 10. As described above, the display 20 of the vehicle 1 may display information about the current weather at Gangnam Station.

Meanwhile, not only the value of the entity but also the target of the intent may provide an additional control item. Accordingly, when the target of the intent is changeable, the controller 130 of the dialogue system 100 may generate a second control signal for displaying information about the changeable target on the display 20.

In the present example, the weather, which is the target of the intent, is changeable to another target, such as temperature, fine dust, and precipitation probability. Accordingly, as shown in FIG. 9, the display 20 may provide information about the additional control item by highlighting the weather or displaying a list indicating the changeable targets.

The user who desires to change the target to fine dust may not utter a full sentence, such as "Tell me about fine dust at Gangnam Station currently", but may input an additional utterance "What about fine dust?" including only the target to be changed. The dialogue system 100 may generate a third control signal for providing information about fine dust in Gangnam Station currently using only the additional utterance of the user "What about fine dust?" and transmit the generated third control signal to the vehicle 1.

The vehicle 1 may perform additional control according to the third control signal. That is, the vehicle 1 may display information about fine dust in Gangnam Station currently on the display 20.

As in the above example, when information about additional control items is displayed on the display, the user may easily identify additional controllable items and rapidly input commands for additional control, so that both the dialogue system 100 and the user may have a natural dialogue so that the workflow for the desired task may be reduced.

On the other hand, in another example of the dialogue system 100 and the vehicle 1, a command for additional control may be manually input. For example, when the display 20 is implemented as a touch screen, the user may change the entity value or target by manipulating the touch screen. Alternatively, the user may change the entity value or target by manipulating a separate input device, such as a button or a jog shuttle.

Hereinafter, a method of controlling a dialogue system according to an embodiment will be described. When implementing the method of controlling the dialogue system according to the embodiment, the above-described dialogue system 100 may be used. Accordingly, the contents described above with reference to FIGS. 1 to 9 may be applied to the method of controlling the dialogue system, unless otherwise described.

Figure 10:
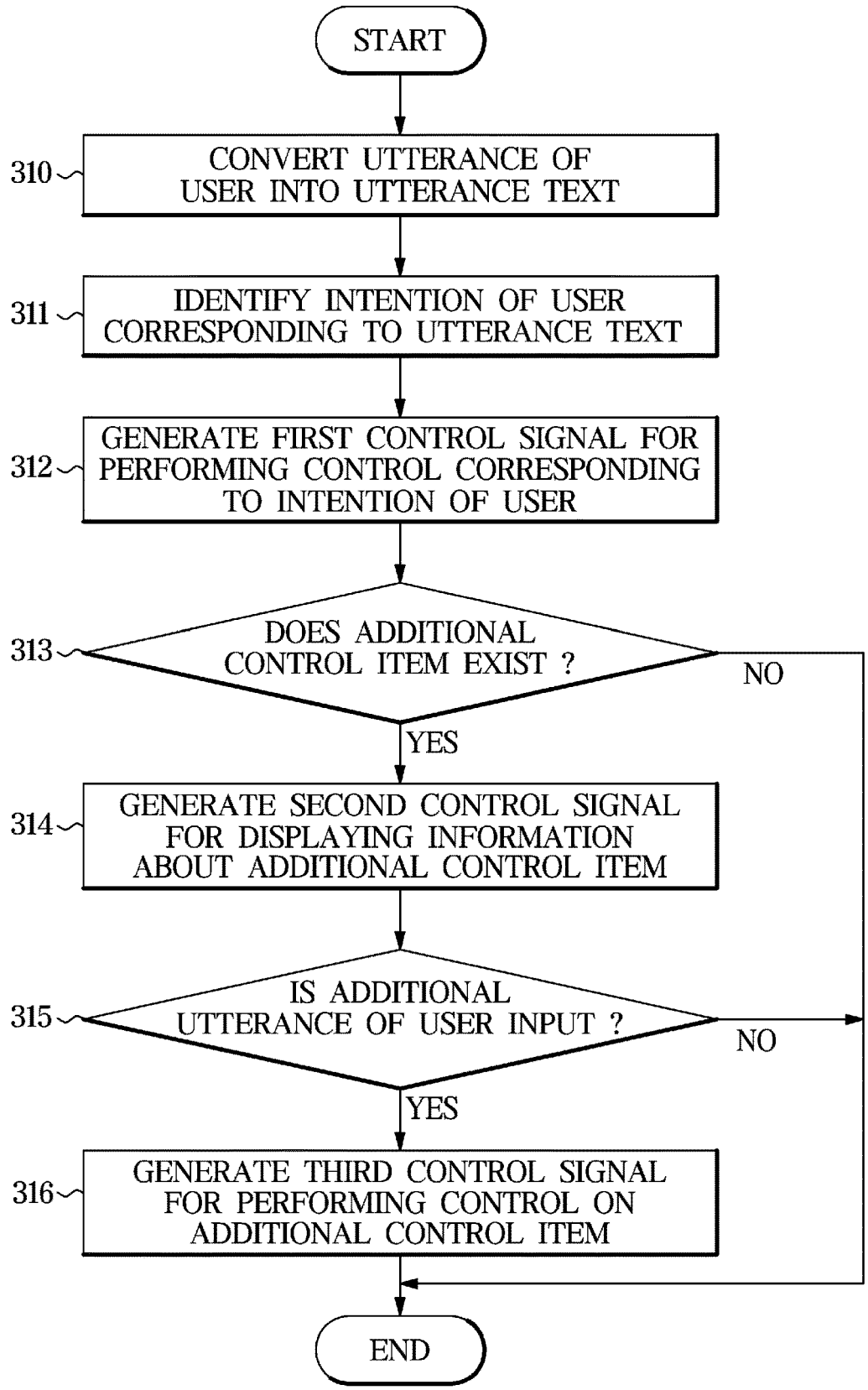
FIG. 10 is a flowchart showing a method of controlling a dialogue system according to an embodiment.

FIG. 10 is a flowchart showing a method of controlling a dialogue system according to an embodiment.

Referring to FIG. 10, an utterance of a user is converted into an utterance text (310), the intention of the user corresponding to the utterance text is identified (311), and a first control signal for performing control corresponding to the intention of the user is generated (312).

The utterance of the user may be input through the microphone 10, and the microphone 10 may be provided in an object performing control according to a control signal generated by the dialogue system 100. For example, the object performing the control may be a vehicle or a home appliance, such as a refrigerator or a TV.

Alternatively, the microphone 10 may be provided in a gateway that relays the dialogue system 100 and the object performing control. For example, the gateway may be a mobile device, such as a mobile phone, a tablet PC, or the like, an AI speaker, or a user terminal, such as a laptop PC.

The intention of the user may be defined by a domain, an intent, and a value of an entity determined based on the utterance text. When the value of the entity is not included in the utterance text, the first control signal for performing control according to a value set as a default may be generated.

When an additional control item exists (YES in operation 313), a second control signal for displaying information about the additional control item is generated (314). When the value of the entity or the target of the intent corresponding to the utterance text are changeable, the controller 130 of the dialogue system 100 may identify that an additional control item exists.

Accordingly, the generating of the second control signal may include generating a control signal for displaying information about a changeable entity value or a changeable target on the display 20.

The dialogue system 100 may transmit the first control signal and the second control signal to the object performing control. Details thereof will be described with reference to FIG. 11.

When an additional utterance of the user corresponding to the additional control item is input (YES in operation 315), a third control signal for performing control on the additional control item is generated (316). When the additional utterance of the user includes a changed entity value, the third control signal for performing control according to the changed entity value may be generated. When the additional utterance of the user includes a changed target, the third signal for performing control according to the changed target may be generated.

Hereinafter, an example of a case where the target of control based on the utterance of the user is the vehicle 1 will be described.

Figure 11:
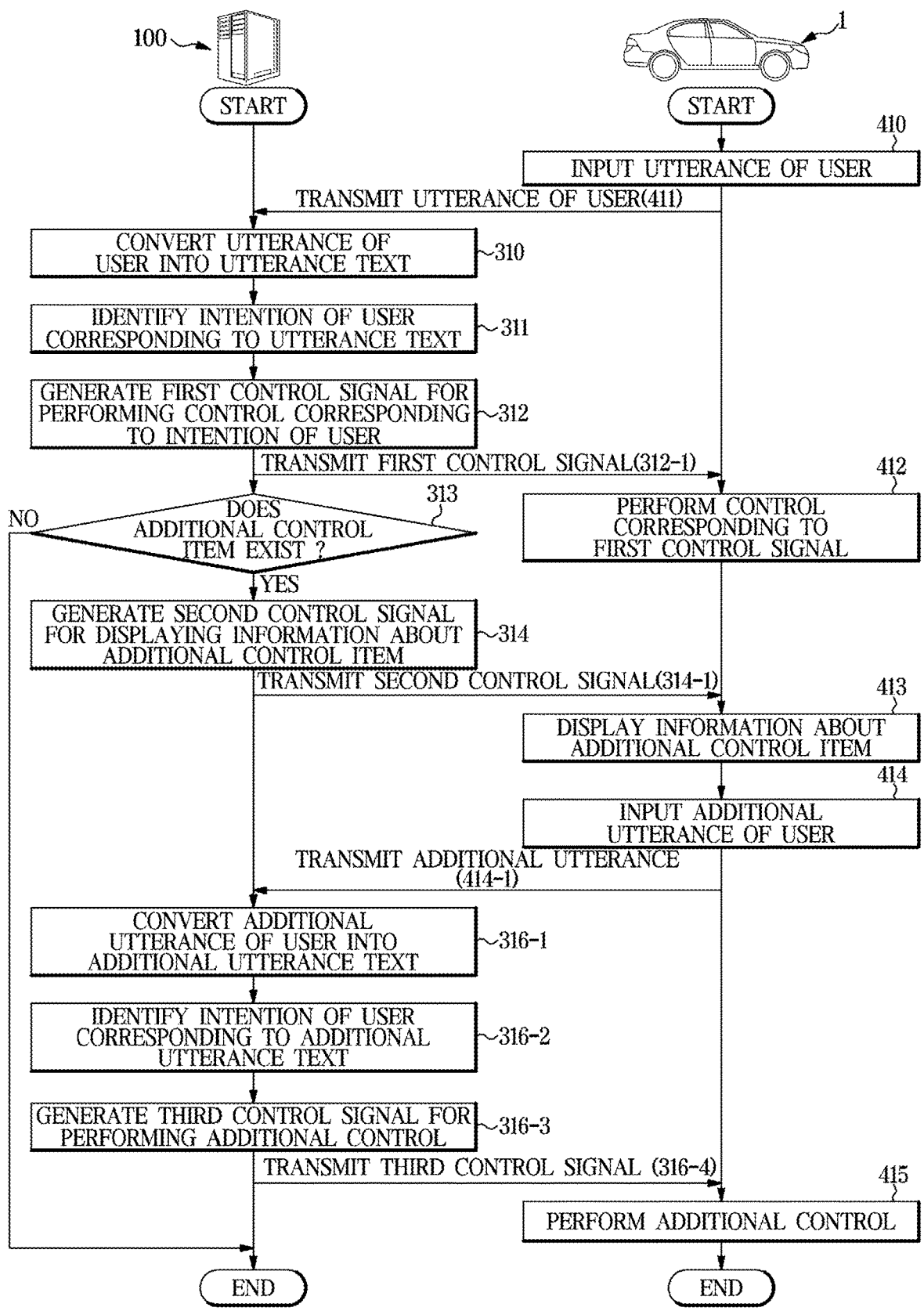
FIG. 11 is another flowchart showing a method of controlling a dialogue system according to an embodiment.

FIG. 11 is another flowchart showing a method of controlling a dialogue system according to an embodiment.

Referring to FIG. 11, when an utterance of a user is input to the microphone 10 provided in the vehicle 1 (410), the communicator 90 of the vehicle 1 transmits the inputted utterance of the user to the dialogue system 100 (411).

When the communicator 140 of the dialogue system 100 receives the utterance of the user, the speech recognizer 110 of the dialogue system 100 converts the utterance of the user into an utterance text (310), and the natural language understanding module 120 of the dialogue system 100 identifies the intention of the user corresponding to the utterance text (311).

The controller 130 of the dialogue system 100 generates a first control signal for performing control corresponding to the intention of the user (312), and the communicator 140 of the dialogue system 100 transmits the first control signal to the vehicle 1 (312-1).

The communicator 90 of the vehicle 1 receives the first control signal, and the controller 80 of the vehicle 1 performs control corresponding to the first control signal (412). For example, air conditioner control, seat warmer control, provision of various types of information, seat position control, door control, etc. may be performed according to the first control signal.

When an additional control item related to the control corresponding to the intention of the user exists (YES in operation 313), the controller 130 of the dialogue system 100 generates a second control signal for displaying information about the additional control item (314).

The communicator 140 of the dialogue system 100 transmits the second control signal to the vehicle 1 (314-1), and the communicator 90 of the vehicle 1 receives the second control signal.

The display 20 of the vehicle 1 displays information about the additional control item (413). The information about the additional control item may be displayed in various forms. For example, as shown in FIGS. 6 to 9, the display 20 may display an additionally controllable intent or entity to be noticeable, together with the control situation according to the first control signal.

Specifically, when the value of the entity extracted from the utterance text is changeable, information about the changeable value of the entity may be displayed on the display 20, and when the target of the intent extracted from the utterance text is changeable, information about the changeable target may be displayed on the display 20.

Alternatively, the display 20 may display a list indicating the values of the entity or the types of the target that are changeable.

When an additional utterance of the user is input to the microphone 10 (414), the communicator 90 of the vehicle 1 transmits the additional utterance of the user to the dialogue system 100 (414-1).

The communicator 140 of the dialogue system 100 receives the additional utterance of the user, the speech recognizer 110 of the dialogue system 100 converts the additional utterance of the user into an additional utterance text (316-1), the natural language understanding module 120 of the dialogue system 100 identifies the intention of the user corresponding to the additional utterance text (316-2), and the controller 130 of the dialogue system 100 generates a third control signal for performing additional control (316-3).

Even when the additional utterance of the user does not include the entire sentence and only includes an utterance corresponding to an additional control item, the dialogue system 100 may identify the intention of the user. Specifically, even when the user does not input the entire utterance for determining all of the domain, the intent, and the value of the entity, the dialogue system 100 may identify the intention of the user only when the value of the entity or the target is included in the additional utterance of the user.

For example, the natural language understanding module 120 may determine the value of the entity based on the additional utterance text output from the speech recognizer 110. The natural language understanding module 120 or the controller 130 may determine the value of the entity based on the current context even without information about the domain or the intent, and may generate a control signal (a third control signal) for performing additional control (additional control related to the control that is already being performed) that matches the intention of the user.

The communicator 140 of the dialogue system 100 transmits the third control signal to the vehicle 1 (316-4), and the communicator 90 of the vehicle 1 receives the third control signal. The controller 80 of the vehicle 1 performs additional control according to the received third control signal (415).

Although the flowchart shows that the second control signal is transmitted after the first control signal is first transmitted, the embodiment of the dialogue system is not limited thereto, and the first control signal and the second control signal may be simultaneously transmitted. The transmission time of the second signal is not limited as long as information about additional control items can be displayed while control corresponding to the first control signal is being performed.

According to the above-described embodiment, control corresponding to the intention of a user and an additional control item related thereto are identified based on an utterance of a user, and information about the additional control item is visually output, thereby easily and rapidly inducing a user's additional utterance, and enabling a natural dialogue and continuous control.

Although embodiments of the disclosure have been described with reference to the accompanying drawings, a person having ordinary skill in the art will appreciate that other specific modifications may be easily made without departing from the technical spirit or essential features of the invention. Therefore, the foregoing embodiments should be regarded as illustrative rather than limiting in all aspects.

What is claimed is:

1. A dialogue system comprising:
   a speech recognizer configured to convert an utterance of a user into an utterance text;
   a natural language understanding module configured to identify an intention of the user based on the utterance text; and
   a controller configured to:
   generate a first control signal for performing control corresponding to the intention of the user;
   identify whether an additional control item related to the control corresponding to the intention of the user exists; and
   in response to the additional control item existing, generate a second control signal for displaying information about the additional control item on a display, wherein the controller is configured to, in response to an additional utterance of the user being input corresponding to the additional control item, generate a third control signal for performing control on the additional control item based on the input additional utterance of the user.

2. The dialogue system of claim 1, wherein the controller is configured to transmit the second control signal to the display while the control corresponding to the intention of the user is being performed.

3. The dialogue system of claim 1, wherein the natural language understanding module is configured to extract a domain, an intent, and a value of an entity from the utterance text to identify the intention of the user corresponding to the utterance text.

4. The dialogue system of claim 3, wherein the controller is configured to, in response to the value of the entity being a changeable value, generate the second control signal for displaying information about the changeable value of the entity.

5. The dialogue system of claim 4, wherein the controller is configured to, in response to the additional utterance of the user including a changed value of the entity, generate the third control signal for performing control according to the changed value of the entity included in the additional utterance of the user.

6. The dialogue system of claim 3, wherein the controller is configured to, in response to a target of the entity being a changeable target, generate the second control signal for displaying information about the changeable target of the entity.

7. The dialogue system of claim 6, wherein the controller is configured to, in response to the additional utterance of the user including a changed target, generate the third control signal for performing control according to the changed target included in the additional utterance of the user.

8. A method of controlling a dialogue system, the method comprising:
   converting an utterance of a user into an utterance text;
   identifying an intention of the user based on the utterance text;
   generating a first control signal for performing control corresponding to the intention of the user;
   in response to existence of an additional control item related to the control corresponding to the intention of the user, generating a second control signal for displaying information about the additional control item on a display; and
   in response to an additional utterance of the user being input corresponding to the additional control item, generating a third control signal for performing control on the additional control item based on the input additional utterance of the user.

9. The method of claim 8, further comprising transmitting the second control signal to the display while the control corresponding to the intention of the user is being performed.

10. The method of claim 8, wherein identifying the intention of the user comprises extracting a domain, an intent, and a value of an entity from the utterance text.

11. The method of claim 10, wherein generating the second control signal comprises, in response to the value of the entity extracted from the utterance text being a changeable value, generating the second control signal for displaying information about the changeable value of the entity on the display.

12. The method of claim 11, wherein generating the third control signal comprises, in response to the additional utterance of the user including a changed value of the entity, generating the third control signal for performing control according to the changed value of the entity.

13. The method of claim 10, wherein generating the second control signal comprises, in response to a target extracted from the utterance text being a changeable target, generating the second control signal for displaying information about the changeable target on the display.

14. The method of claim 13, wherein generating the third control signal comprises, in response to the additional utterance of the user including a changed target, generating the third control signal for performing control according to the changed target.

15. A system comprising:
   at least one processor; and
   a memory with computer readable instructions stored thereon, wherein the instructions, when executed by the at least one processors, enable the system to perform:
      converting an utterance of a user into an utterance text,
      identifying an intention of the user based on the utterance text,
      generating a first control signal for performing control corresponding to the intention of the user,
      in response to existence of an additional control item related to the control corresponding to the intention of the user, generating a second control signal for displaying information about the additional control item on a display, and
      in response to an additional utterance of the user being input corresponding to the additional control item, generating a third control signal for performing control on the additional control item based on the input additional utterance of the user.

16. The system of claim 15, wherein the instructions, when executed by the at least one processor, further enable the system to perform: transmitting the second control signal to the display while the control corresponding to the intention of the user is being performed.

17. The system of claim 15, wherein identifying the intention of the user comprises extracting a domain, an intent, and a value of an entity from the utterance text.

18. The system of claim 17, wherein generating the second control signal comprises, in response to the value of the entity extracted from the utterance text being a changeable value, generating the second control signal for displaying information about the changeable value of the entity on the display.

* * * * *